United States Patent [19]

Watanabe et al.

[11] Patent Number: 5,105,631
[45] Date of Patent: Apr. 21, 1992

[54] ICE LIFT APPARATUS

[75] Inventors: Takashi Watanabe; Ikuo Miyazaki; Hiroshi Torimitsu; Osamu Nagata, all of Toyoake, Japan

[73] Assignee: Hoshizaki Denki Kabushiki Kaisha, Toyoake, Japan

[21] Appl. No.: 622,950

[22] Filed: Dec. 6, 1990

[51] Int. Cl.$^5$ ............................................. F25C 5/18
[52] U.S. Cl. ............................... 62/344; 198/550.12; 198/735.1; 414/327
[58] Field of Search ............ 62/344; 198/397, 550.12, 198/728, 735.1; 414/327

[56] References Cited

U.S. PATENT DOCUMENTS

| | | | |
|---|---|---|---|
| 2,754,801 | 7/1956 | Reese | 198/550.12 X |
| 2,960,212 | 11/1960 | Black et al. | 198/550.12 X |
| 3,515,260 | 6/1970 | Clyne | 198/550.12 X |
| 3,685,167 | 4/1972 | Zabroski et al. | 198/357 X |
| 3,835,985 | 9/1974 | Johnson | 198/398 X |
| 3,918,266 | 11/1975 | Gindy et al. | 62/344 X |
| 4,176,528 | 12/1979 | Frohbieter | 62/344 |
| 4,225,034 | 9/1980 | Sarovich | 198/728 X |

Primary Examiner—William E. Tapolcai
Attorney, Agent, or Firm—Brooks Haidt Haffner & Delahunty

[57] ABSTRACT

An ice lift apparatus for lifting ice cubes manufactured by an ice maker comprising a horizontal transporting section, a vertical transporting section and an ice discharge section is provided. The apparatus comprises two endless conveyor members driven by a driving unit, a multiplicity of transverse bars mounted between the conveyor members at an interval slightly greater than the longest side of the ice cube, and a stationary guide member disposed within a region defined by the running path of the endless conveyor members with a distance from the transverse bars located at the side of the forward running path of the conveyor members, which distance lies in a range of about ½ to ⅔ of the bar interval. Also, the guide member is so disposed as to cause the distance to decrease progressively toward the ice discharge section. When the apparatus is installed within an ice storage chamber having a front door, the driving unit can be controlled by a control means so as to prevent actuation thereof in the open state of the front door.

36 Claims, 9 Drawing Sheets

ICE LIFT APPARATUS

BACKGROUND OF THE INVENTION

1. Field of the Invention

The present invention relates to an ice lift apparatus for vertically upwardly conveying or transporting ice pellets, such as ice cubes having a substantially uniform shape manufactured by an ice making machine.

2. Description of the Prior Art

In the automatic ice making machine known heretofore, an ice storage chamber thereof is generally provided with a front door for allowing ice cubes therein to be taken out from the chamber by opening the front door. To this end, a scoop or the like tool is generally employed. However, not a little labor is imposed on the person in taking out the ice cubes dependent on the position of the front door.

Under these circumstances, it has already been proposed to install an ice lift apparaus within the ice storage chamber so that the ice cubes can be taken out therefrom through an exit port provided in the top of the ice storage chamber. In that case, in order to transport the ice cubes to the exit port, a conveyor apparatus (as disclosed in Japanese Utility Model Application Laid-Open No. 26162/1972) or a bucket elevator (as disclosed in Japanese Utility Model Application Laid-Open No. 77742/1973) have been employed. As conventional ice lift apparatuses, which may be employed in other applications than the ice making machine, there are a screw type conveying apparatus (see Japanese Utility Model Application Laid-Open No. 130675/1981) and an ice scraping/feeding apparatus including a pair of endless conveyor members having a large number of rake means mounted thereon (see Japanese Patent Publication No. 11792/1985).

Figures 17, 18, 19:
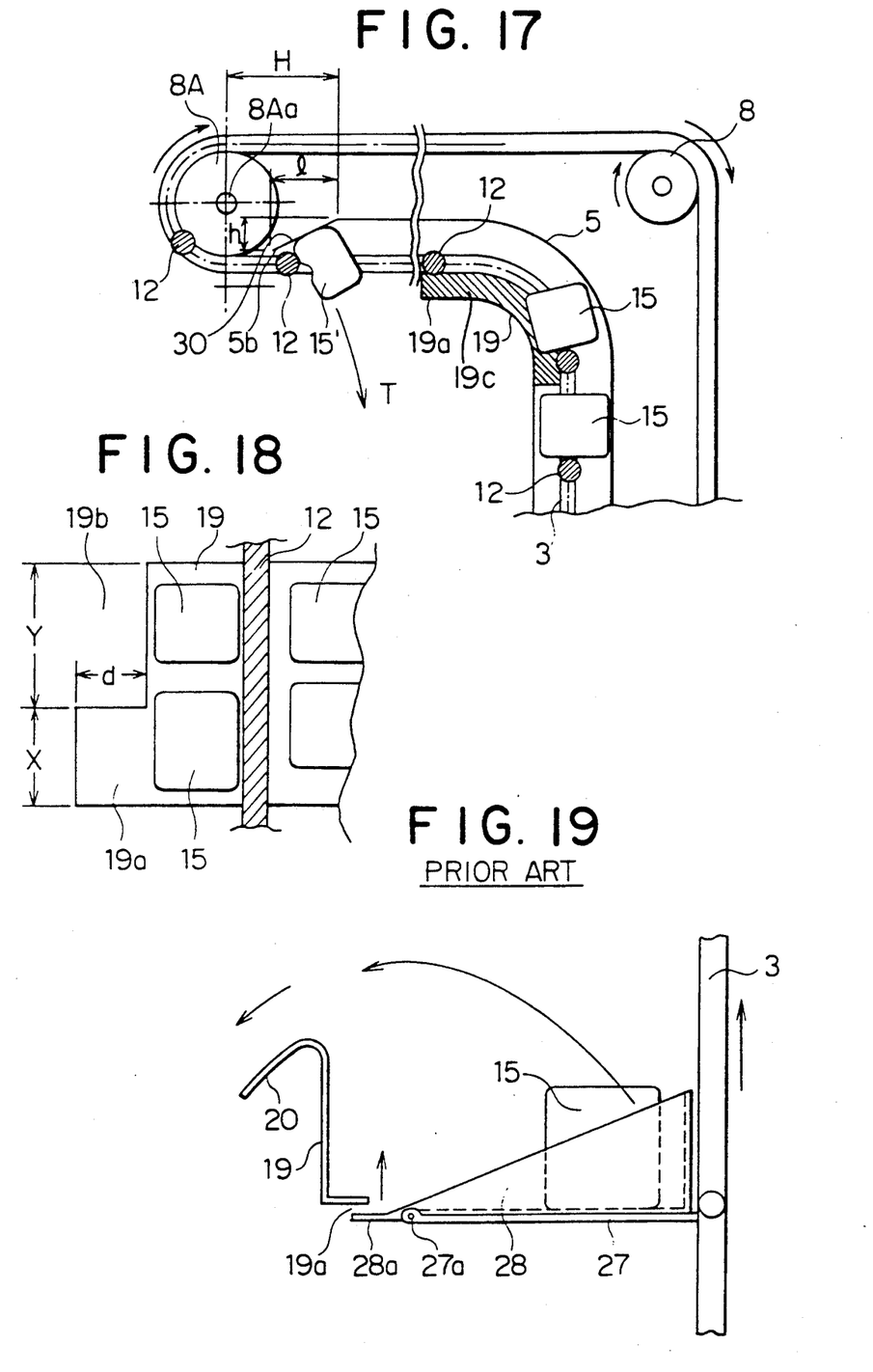
FIG. 17 is an enlarged sectional view showing a structure of the ice discharge section in the ice lift apparatus shown in FIG. 16.
FIG. 18 is a plan view showing in section a further modified structure of the ice discharge section in the ice lift apparatus according to still another embodiment of the present invention.
FIG. 19 is a side elevational view showing a major portion of an ice lift apparatus known heretofore.

Further, such a structure as shown in FIG. 19 is known, wherein a rotatable cage 28 is pivotally mounted on each of supporting plates 27 which in turn are mounted on a pair of endless conveyor chains 3, and the cage 28 is forced to rotate or swing for discharging an ice cube accommodated therein onto an ice discharge port 20. In FIG. 19, a reference symbol 19a denotes a hook-like tip end portion which is formed integrally with an ice guide 19 and adapted to engage with a tip end portion 28a of the rotatable cage 28 to thereby cause the cage 28 to rotate or swing about a pin 27a.

However, in the prior art ice transporting apparatus in which conveyor means is employed, not only difficulty is encountered in vertically upwardly transporting the ice cubes in a satisfactory manner, but also a lot of space is required for installing the transporting apparatus. More specifically, in the case of the ice transporting apparatus in which the buckets or rake means are mounted on a pair of endless conveyor chains, the buckets which project from the endless conveyor chains require additional room, making it difficult to install the ice transporting apparatus within a relatively narrow space in the ice storage chamber of the ice making machine. Also, the amount of ice cubes capable of being transported becomes different dependent on the amount of ice being stored. Further, the position of the ice discharge port is necessarily determined by the position at which the direction of the movement of the endless conveyor chain is reversed, resulting in a further problem. On the other hand, in the case of the screw type ice transporting apparatus, ice cubes tend to be jammed between a screw shaft and a cylinder arranged around the screw shaft. This may cause the apparatus to be damaged and, needless to say, results in a problem that the shape of the ice cube is injured.

Furthermore, in the apparatus in which the rotatable cages are swingably mounted on the endless conveyor chains through the respective supporting plates, the position of the discharge port can certainly be set up arbitrarily. However, the rotatable cages protruding from the endless conveyor chains occupy correspondingly an additional space. Also, a large number of rotatable cages have to be pivotally mounted on the supporting plates, which presents apparently a problem that the mechanical structure becomes necessarily much complicated.

Accordingly, it can be understood that there apparently exists a demand for a novel ice lift apparatus which can avoid the problems mentioned above.

SUMMARY OF THE INVENTION

It is a primary object of the present invention to provide an ice lift apparatus which can be easily installed within a narrow space and can vertically upwardly transport ice pellets substantially in a constant amount regardless of the amount of ice being stored.

It is another object of the present invention to provide an ice lift apparatus of a simplified structure which does not require a large space for installation thereof and which allows an ice discharge port to be arranged at an arbitrarily selectable position.

In view of the above and other objects which will be more apparent as description proceeds, there is provided according to an aspect of the present invention an ice lift apparatus for vertically upwardly transporting the ice pellets produced by an ice making machine, which is composed of a vertical ice transporting section connected continuously to a horizontal ice transporting section. The apparatus comprises at least a pair of endless conveyor members driven by driving means, a multiplicity of transverse bars mounted between the endless conveyor members with an inter-bar gap or distance which is slightly greater than a longest side of the ice pellets as manufactured, and a stationary guide member disposed within a region defined by forward and backward running paths of the endless conveyor members with a distance in a range of about $\frac{1}{4}$ to $\frac{2}{3}$ of the inter-bar distance relative to the transverse bars located along the forward running path of the endless conveyor members.

In operation, of the ice cubes placed over the horizontal transporting section of the ice lift apparatus, those disposed within the spaces defined through cooperation of the paired endless conveyor members, the adjacent transverse bars and the stationary guide member are caused to move upwardly through the vertical transporting section by means of the individual transverse bars which move in following the rotation of the endless conveyor members. However, those ice cubes which are not accommodated within the spaces mentioned above, i.e. those resting simply on the horizontal transporting section are not moved upwardly or lifted by the vertical transporting section. Further, crushed ice cubes or pieces of smaller sizes can not obtain sufficient support of the transverse bar and drop from the vertical transporting section under vibration of the endless conveyor members or under inertial repulsion to which the ice pieces are subjected to at a bending portion intervening the horizontal and vertical transporting sections. Thus, the amount of ice cubes as transported does not exceed that of those which can be accommodated within the spaces mentioned above. Also, the shape and the size of the ice cubes as transported can be made substantially uniform.

When the ice lifting apparatus according to the present invention is installed within the ice storage chamber equipped with a front door, the apparatus may be so controlled by suitable control means that the driving means for the endless conveyor members is inhibited from actuation in the open state of the front door.

According to another aspect of the present invention, there is provided an ice lift apparatus which comprises at least a pair of endless conveyor members driven by driving means such as an electric motor, a multiplicity of transverse bars disposed between the endless conveyor members with a predetermined equidistance between the adjacent bars, and a stationary guide member disposed within a space enclosed by the transverse bars such that the distance between the stationary guide member and the transverse bars is progressively decreased toward an ice discharge section.

The ice cubes are supported through cooperation of a surface of the stationary guide member and the individual transverse bars and pushed upwardly by the transverse bars forced to move along with the endless conveyor members when the latter are driven by the driving means. At the ice discharge section, where distance between the stationary guide member and the transverse bar is decreased, the position of the linear support provided by the transverse bar becomes offset from the center of gravity of the ice cube, as a result of which the latter rocks to drop off from the ice lift apparatus to be thereby discharged outwardly.

DESCRIPTION OF THE DRAWINGS

Other objects, advantages and novel features of the present invention will become more apparent from the following detailed description of preferred or exemplary embodiments thereof, when considered in conjunction with the accompanying drawings wherein.

DESCRIPTION OF THE PREFERRED EMBODIMENTS

The present invention will be described in detail in conjunction with exemplary embodiments thereof by reference to the drawings, in which same or corresponding parts are denoted by like reference symbols throughout the various figures.

Figure 1:
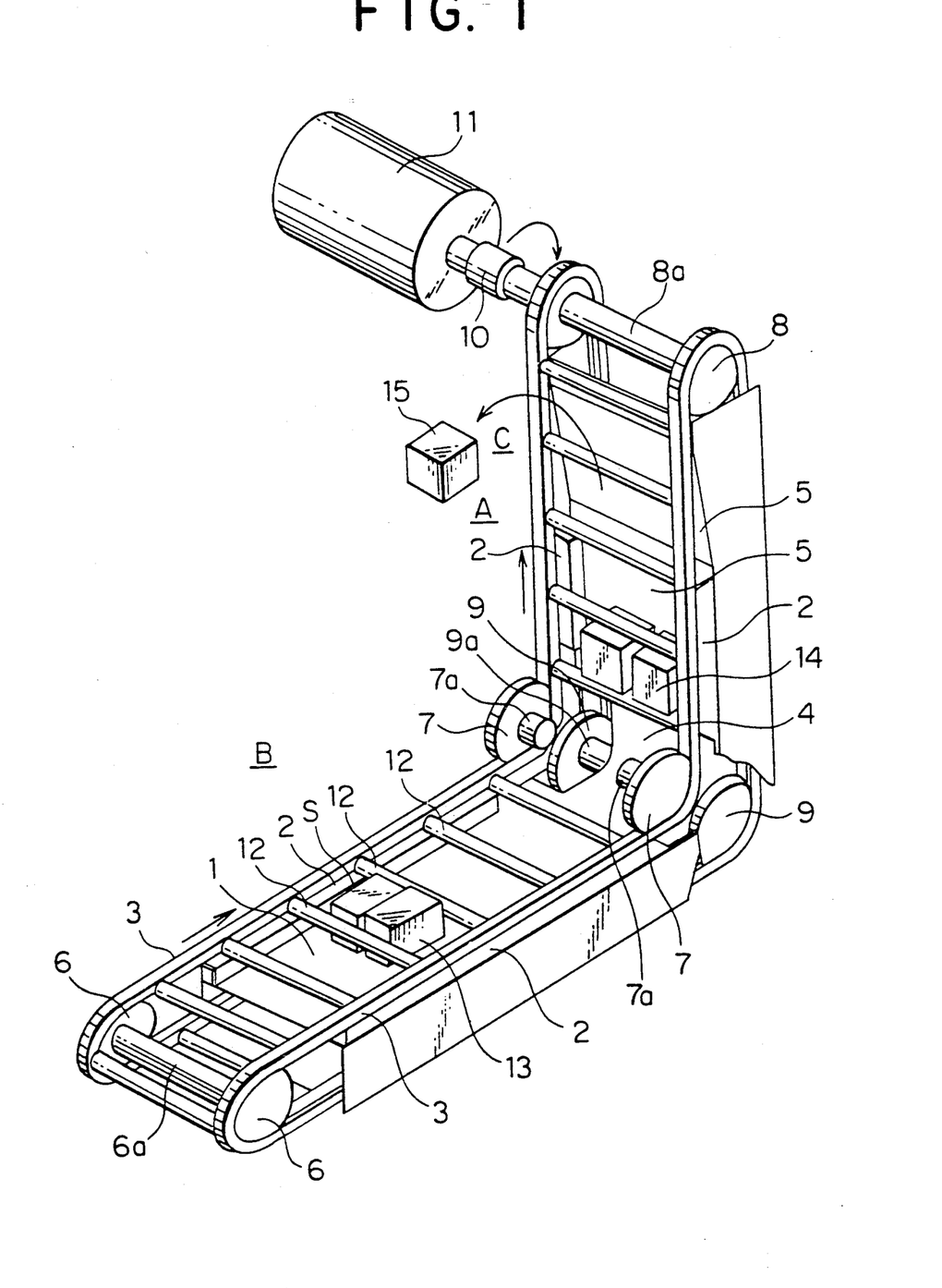
FIG. 1 is a perspective view schematically showing a structure of the ice lift apparatus according to a preferred embodiment of the present invention.

Referring to FIG. 1, there is shown an ice lift apparatus according to an embodiment of the present invention, which includes a horizontal ice transporting section B, a vertical ice transporting section A, and an ice discharge section C arranged to provide a generally L-shaped configuration. Ice cubes are loaded on the ice lift apparatus at the horizontal transporting section B and carried upwardly through the vertical transporting section B to be discharged from the ice lift apparatus at the discharge section C. Although the horizontal transporting section B is shown as being constructed integrally with the vertical transporting section A in the illustrated embodiment, it should be understood that the horizontal section B may be designed to be separated from the vertical transporting section A. In this case, the horizontal section B may also be replaced by an oblique guide or transporting mechanism which has been known heretofore.

A pair of parallel endless conveyor members shown in a simplified form in the figure may be constituted by a pair of timing belts or endless chains 3, 3 made of a stainless steel or synthetic resin which are well known in the art, wherein a large number of transverse bars denoted by 12 are mounted between the endless chains 3 with a predetermined equidistance between the adjacent bars. The distance or gap between each pair of the adjacent bars 12 is determined or selected by taking into consideration of the size of ice cubes to be conveyed, i.e. the size of ice cubes manufactured by an associated ice making machine (not shown) so that it is slightly wider than the length of the longest side of the ice cube. By way of example, when the ice cube is of a parallelpiped in a size of 28 mm × 28 mm × 32 mm, the inter-bar distance is selected slightly greater than 32 mm.

In the horizontal transporting section B, disposed within a region defined by a number of the transverse bars 12 is a stationary horizontal guide member 1 with such a distance from the overlying transverse bars 12 which is about ⅓ to ⅔ of the longest side of the ice cube to be conveyed, i.e. about ⅓ to ⅔ of the distance between the adjacent transverse bars 12. Mounted at both longitudinal sides of the stationary horizontal guide member 1 are guide rails 2, each of which is made of a material insusceptible to water-absorption and having a self-lubricating property for the purpose of guiding the pair of the endless conveyor chains 3 (refer to FIG. 2).

Disposed at one end of the horizontal transporting section B are a pair of sprockets 6 having a shaft 6a which is rotatably mounted on bearings (not shown), which sprockets 6 serve to guide the movement of the chains 3. These sprockets 6 may be made of a stainless steel or a synthetic resin as used for the conveyor chains 3.

On the other hand, there are disposed at the other end of the horizontal transporting section B a pair of guide sprockets 7 for guiding upper runs of the conveyor chains 3 and another pair of guide sprockets 9 for guiding the lower runs of the conveyor chains 3, respectively, wherein the pairs of the sprockets 7 and 9 cooperate to guide the chains 3 from the horizontal section B to the vertical section A and vice versa. Also, the guide sprockets 7 and 9 may be made of a stainless steel or synthetic resin as with the case of the sprocket 6. The shafts 7a and 9a on which the sprockets 7 and 9 are fixedly mounted are rotatably supported by bearings (not shown), respectively. In this respect, it will be noted that those guide sprockets 7 and 9 may be replaced by conventional grooved guide rollers.

A stationary guide portion 4 located at a region in which the sprockets 7 and 9 are mounted is constituted by a plate member bent at 90° C. with a circular arc congruent with that of the outer periphery of the guide sprocket 7 and continues to the vertical portion of the stationary guide member 5. It should also be noted that the guide rails 2 for the stationary horizontal guide member 1 may extend substantially up to the top of the stationary vertical guide member 5, while extending along the bent or curved guide member 4.

At the top end of the vertical transporting section A, there are disposed a pair of sprockets 8 for driving the respective conveyor chains 3. The sprockets 8 are fixedly mounted on a shaft 8a which is connected to an electric motor 11 through a coupling 10. The driving sprockets 8 are made of a stainless steel or synthetic resin as with the case of the other sprockets, and the shaft 8a of the sprockets 8 is rotatably supported by means of bearings (not shown). Adjustment of a tension in the conveyor chains 3 can be effected by displacing correspondingly the position of the driving sprocket shaft 8a together with the coupling 10 and the electric motor 11.

Figure 2:
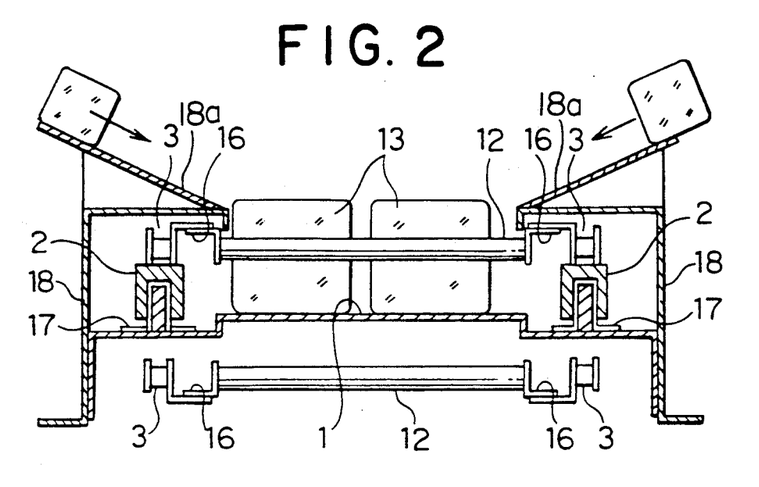
FIG. 2 is an enlarged sectional view of a horizontal transporting section of the ice lift apparatus shown in FIG. 1.

Referring to FIG. 2, a reference numeral 16 denotes a fixture used for mounting the associated transverse bar 12 to the chain 3 and a numeral 17 denotes a fixture for mounting the guide rail 2 to the stationary guide member 1. Further, a reference numeral 18 denotes a cover for the ice lift apparatus which is made of a stainless steel or a synthetic resin. As shown in FIG. 2, an inclined guide plate 18a may be mounted on the top of the cover 18 so that ice cubes 13 positioned thereon can be slid into the afore-mentioned region S defined between the adjacent bars 12.

The ice discharge section C is provided by the vertical ice transporting section A in the case of the instant embodiment. That is, the ice discharge section C is formed by disposing the stationary vertical guide member 5 with such inclination that the distance between the stationary vertical guide member 5 and the upper transverse bars 12 in the vertical bar array is progressively decreased.

Figure 4:
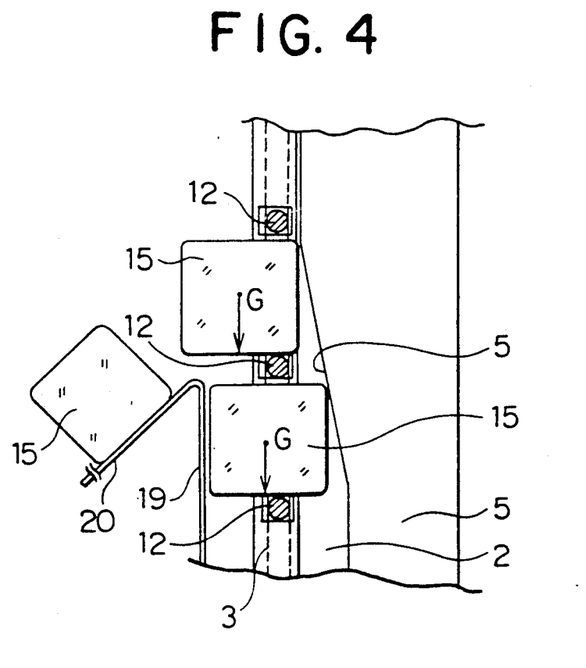
FIG. 4 is a vertical sectional view showing a major portion of an ice discharge section of the ice lift apparatus shown in FIG. 1.

As shown in FIG. 4, in the ice discharge section C, there is provided at the front side of the vertical section A (i.e. at the side facing in opposition to the stationary guide member 5) an ice guide plate 19 having an ice discharge port 20 which is disposed at a location where the smooth top end portion of the vertically disposed stationary guide member 5 is inclined to such an extent that the distance between the guide member 5 and the transverse bar 12 approaches substantially to zero. The ice guide 19 is preferably made of a stainless steel or synthetic resin.

Figure 5:
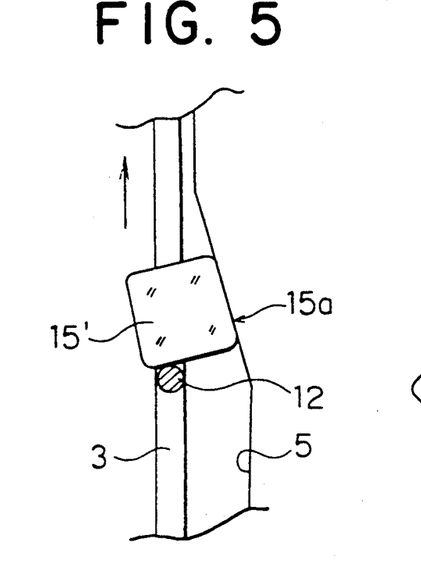
FIG. 5 is a sectional view illustrating behavior of an ice cube in the ice discharge section shown in FIG. 4.

Turning to FIG. 5, there may occur such a situation in which the surface portions of the ice cubes are melted as they are conveyed over and along the smooth surfaces of the statinary guide members 1, 4 and 5, whereby the ice cube is brought into close contact with the surface of the stationary vertical guide member 5 due to wetting (or surface tension of water, to say in another way) of the ice cube surface as indicated at 15a for an ice cube 15' in FIG. 5. In particular, when the ice cubes adhere closely to the surface of the stationary guide member 5 at the top end portion thereof, the ice cubes 15' may be prevented from being discharged through the ice delivery port 20 and further fed upwardly, resulting in a so-called ice jamming.

Figure 6:
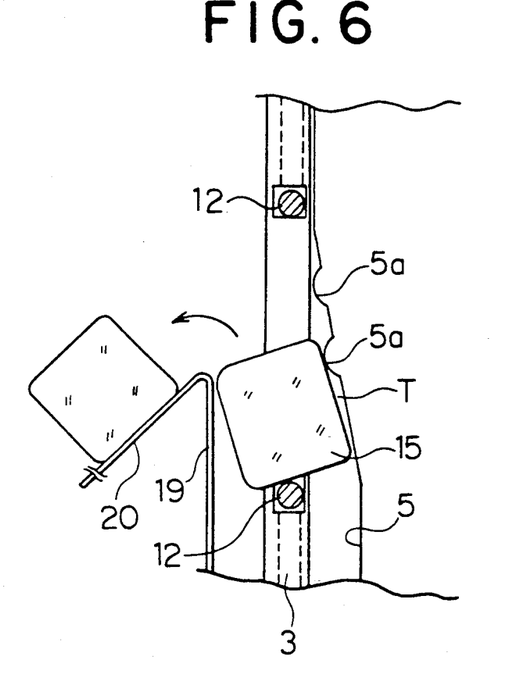
FIG. 6 is a vertical sectional view showing a major portion of a modified structure of the ice discharge section of the ice lift apparatus according to the present invention.

In order to prevent occurrence of such sticky adhesion of the ice cubes 15', a modified guide member 5 shown in FIG. 6 is provided with rib-like protrusions 5a extending transversely of the surface of the vertical stationary guide member 5 at an upper portion thereof where the vertical stationary guide member 5 is disposed with such inclination that the distance relative to the transverse bars is progressively decreased. More specifically, in the ice discharge section C shown in FIG. 6, the ice cube 15 and the surface of the stationary guide member 5 are separated from each other with a gap T in the vicinity of the rib-like protrusions 5a. With this arrangement, the above situation can positively be prevented from occurrence in which the ice cubes are conveyed while sticking to the surface of the stationary guide member 5 due to the wetting of the surface 15a of the ice cube 15 to thereby involve the ice jamming.

Figure 7:
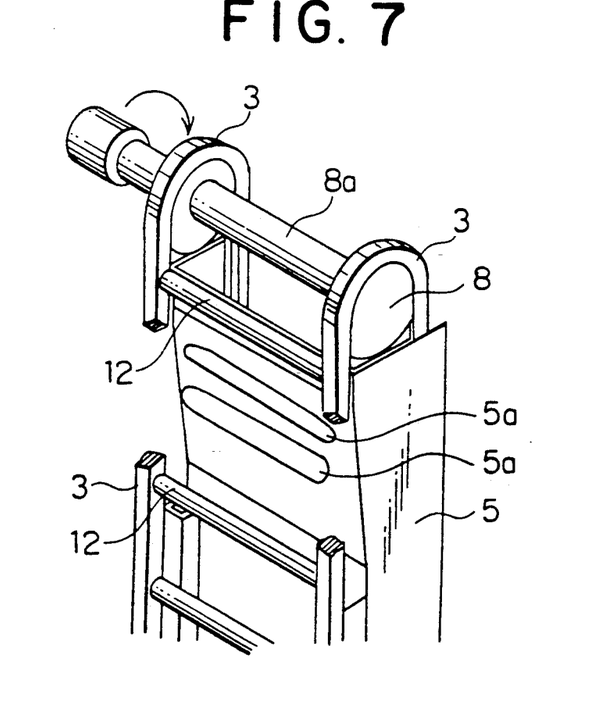
FIG. 7 is a perspective view partially showing a major portion of the ice discharge section of the ice lift apparatus according to the modified embodiment of the invention shown in FIG. 6.

FIG. 7 shows, in perspective view, an exemplary shape or configuration of the rib-like protrusions 5a. It should however be noted that the rib-like protrusion 5a may be replaced by any other suitable means such as rough surface, recesses or bores or mesh may be adopted to the similar effect. In other words, any suitable means capable of preventing the close or sticky contact from taking place between the ice surface 15a and the stationary vertical guide member 5 may be employed. It is further noted in conjunction with the rib-like protrusion 5a that the surface thereof may preferably be roughened.

Figure 10:
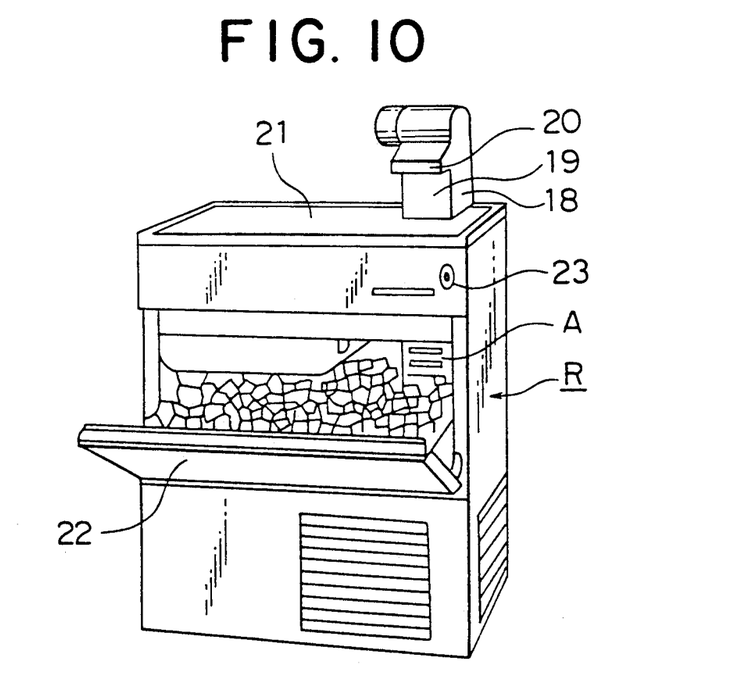
FIG. 10 is a perspective view showing an ice making machine in which an ice lift apparatus according to the present invention can be installed.

FIG. 10 shows, by way of example, an ice making machine equipped with an ice storage chamber within which the ice lift apparatus according to the present invention can be installed. Referring to FIG. 10, a reference numeral 21 denotes a ceiling plate of the ice making machine, 22 denotes a front door, and 23 denotes a switch for bringing the ice lift apparatus in operation. The ice lift apparatus is so installed within the ice storage chamber that the horizontal transporting section B thereof is positioned at a location where the ice cubes just manufactured by an ice making mold (not shown) drop, while the vertical transporting section A is positioned at the deepest location where the maximum chamber space is available with the ice delivery port 20 being disposed above the ceiling plate 21. With such installation of the ice lift apparatus within the ice storage chamber, the ice pellets or cubes can be conveyed by the horizontal transporting section B from the location where the amount of stored ice is maximum to the location where it is minimum. This allows the ice cubes to be taken out at a high position such as above the ceiling plate 21 without appreciably diminishing the storage capacity of the ice storage chamber.

Figure 3:
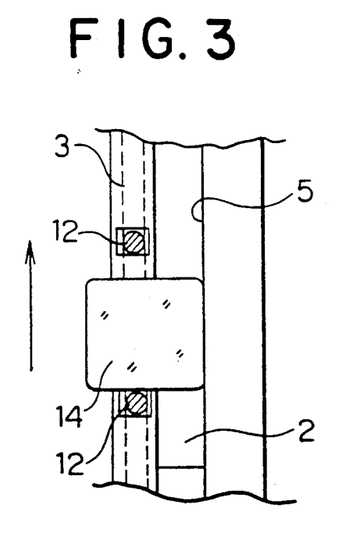
FIG. 3 is a vertical sectional view showing a major portion of a vertical transporting section in the ice lift apparatus shown in FIG. 1.

Referring to FIGS. 1 and 10, when the switch 23 is closed, the motor 11 starts to rotate. As a result, the driving sprocket shaft 8a is rotated in the direction indicated by an arrow, causing the driving sprockets 8 to feed forwardly the endless coveyor chains 3 in the direction indicated by an arrow. In the meanwhile, the ice cubes 13 occupying the space S defined by the pair of the adjacent transverse bars 12, the parallel conveyor chains 3 and the stationary horizontal guide member 1 at the horizontal transporting section B are transported as the transverse bars 12 move in accompanying the rotation of the chains 3 and reach the vertical transporting section A after having passed through the bent portion 4 of the stationary horizontal guide member 1, wherein the ice cubes are carried upwardly as indicated by an arrow, while being supported by the transverse bars 12 and the stationary vertical guide member 5, as indicated at 14 in FIGS. 1 and 3. Regarding those ice cubes which have not successfully been accommodated within the space S at the horizontal transporting section B, they can not be carried upwardly because they are not supported by any one of the transverse bars 12 in the vertical transporting section A.

Thus, it will be understood that the ice cubes carried vertically upwardly, i.e., lifted by the ice lift apparatus are only those which have been accommodated within the space S as mentioned above. Accordingly, the amount of ice carried upwardly can be determined relatively easily on the basis of the operation period of time of the ice lift apparatus. Incidentally, it is to be noted that since small ice pieces resulting from crushing of ice cubes can naturally be accommodated within the space S with large clearances and become instable, many of these small ice pieces are detached and thrown out from the vertical transporting section A under the effects of vibration of the conveyor chains 3 and inertia to which the small ice pieces are subjected upon abrupt change in the moving direction at the bent portion 4 and thus less likely to be conveyed up to the intrinsic ice delivery port 20 to be discharged therefrom. In this respect, it can also be noted that the ice lift apparatus described above is inherently imparted with an ice sorting function or capability.

The ice cubes are discharged at the discharge section C. More specifically, referring to FIG. 4, the ice cubes denoted by a numeral 15 and supported by the transverse bar 12 are guided over and along an upper end portion of the stationary vertical guide 5 which is so inclined that the gap between the guide 5 and the transverse bars 12 is progressively diminished toward the ice discharge section C. Consequently, the center of gravity G of the ice cube 15 becomes more offset from the point of support provided by the transverse bar 12 as the ice cube approaches closely to the ice discharge section C. Thus, the ice cube tends to incline forwardly, but it is not allowed to do so by the ice guide 19. However, when the ice cube 15 further moves upwardly and reaches to a location where the gravity or weight of the ice cube 15 overcomes the adhesion thereof to the stationary guide member 5, the ice cube is caused to move to the delivery port 20. In this manner, with the provision of the ice guide 19, the ice cube can be discharged positively at a predetermined position.

Thus, it will be understood from the foregoing that in the preferred embodiment of the ice lift apparatus according to the invention, the lateral width of the vertical transporting section A substantially corresponds to the diameter of the sprockets and occupies only the widthwise space between the pair of endless conveyor members (of course, three or more endless conveyor chains or members may be employed with the transverse bars being mounted each between the adjacent endless conveyor members, if required.). Accordingly, the ice lift apparatus can be installed within a narrow space such as an ice storage chamber of an ice making machine R by selecting such a place which is preferred from the standpoint of effective utilization of the available space without appreciably reducing the ice storage capacity of the ice storage chamber. Further, because the apparatus is allowed to carry only a substantially constant amount of ice cubes accommodated within the space S independent of the amount of ice being stored in the chamber, the total amount of ice as conveyed can be controlled in a much facilitated manner simply by controlling the apparatus driving speed and the operation period of time of the apparatus. Also, since those ice cubes having dimensions which are unfit to the space S can not be carried upwardly, selection of ice cubes being conveyed for discharge can be automatically performed.

In practical applications, there exists within an ice storage chamber a variety of ice cubes which differ from one another in the size and/or shape thereof because of the admixed presence of ice cubes which have just been detached from the ice forming mold and those considerably melted in the course of significant time lapse from the completion of the defreezing operation. Under these circumstances, some of the ice cubes may be conveyed without being delivered at the ice discharge section C. For example, in the case of the ice cube 15' of a reduced diameter shown in FIG. 5, the ratio at which the center of gravity of the ice cube 15' is offset from the support provided by the transverse bar 12 is relatively low. Consequently, the ice cube 15' may remain in the state resting on the transverse bar 12 even when it is carried upwardly beyond the guide 19. Also, due to wetting of the surface 15a of the ice cube 15' partly melted in the course of transportation, it may adhere to the surface of the vertically disposed stationary guide member 5 and therefore may continue to be carried upwardly passing through the ice discharge section.

In this connection, it will be noted that in the embodiment shown in FIGS. 6 and 7, the surface of the stationary vertical guide member 5 is formed with the rib-like protrusions 5a, as described hereinbefore. Consequently, the gap T is forcibly produced between the ice cube 15 and the surface of the stationary vertical guide member 5 at the locations of the rib-like protrusions 5a, whereby the ice cube is positively prevented from remaining as sticking to the surface of the guide member 5.

Figure 8:
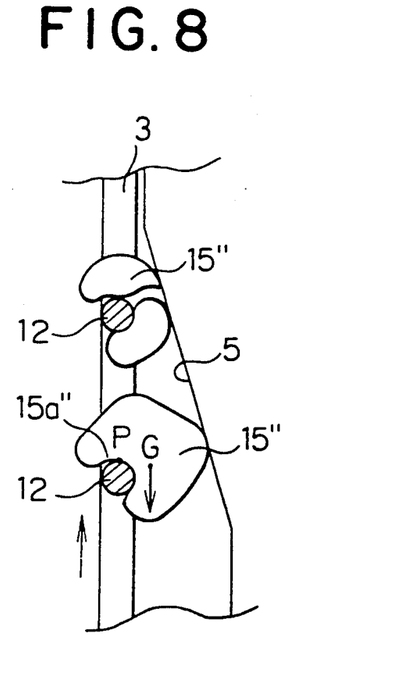
FIG. 8 is a sectional view illustrating the state of ice cube located at the ice discharge section shown in FIG. 4 at the time when ice transporting operation is restarted.
Figure 9:
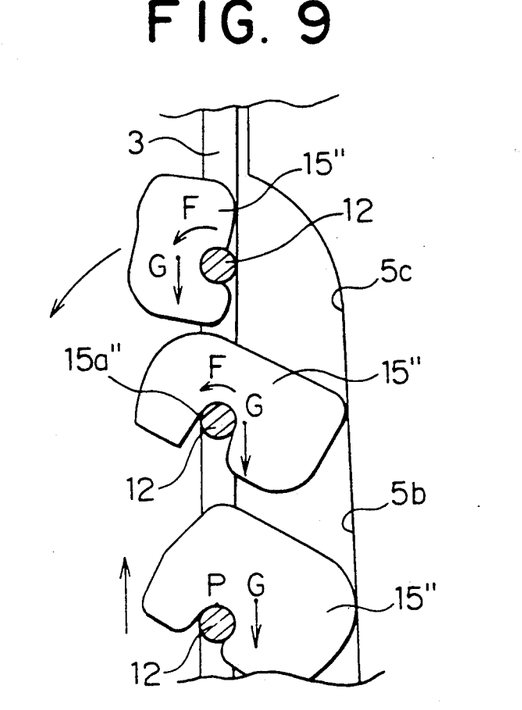
FIG. 9 is a vertical sectional view showing a major portion of another modified embodiment of the ice discharge section in the ice lift apparatus according to the present invention.

Further, referring to FIG. 8, when the ice lift apparatus is not operated for a relatively long period of time with the bottoms of ice cubes 15" being placed on some transverse bars 12 in the vertical section A, the ice cube 15" will be melted and formed with a recess 15" in the bottom thereof and accordingly the recess 15a" will closely hold the transverse bar 12. If the operation of the ice lift apparatus again starts under such a bar holding state, the ice cube 15" will be compressed to be crushed between the transverse bar 12 and the vertical stationary guide member 5. In order to prevent such situation from occurring, an embodiment of FIG. 9 provides the guide member 5 with a slightly inclined surface 5b at the lower portion thereof and with a curved surface 5c at the upper portion thereof adjacent to the discharge section C. With such an arrangement, the ice cube 15" having the center of gravity G located lower than a point P at which the ice cube is supported by the transverse bar 12 undergoes only progressively the rotating action of the vertical stationary guide member 5 of which distance to the transverse bars is increasingly narrowed. Accordingly, there is required a relatively long initial run for bringing the center of gravity G of the ice cube 15" above the supporting point P. In this connection, it will be noted that the slightly inclined surface 5b can ensure such an initial run, while the curved surface 5c provided adjacent to the discharge port 20 can ensure smooth rotation of the ice cube 15" toward the discharge port 20. Also, when the transverse bar 12 itself is rotatably mounted, the effect mentioned above can be further enhanced. By preventing the ice cube 15" from being compressed and crushed due to transportation of the ice cube 15" with its recess 15a" closely holding the transverse bar 12, noise otherwise produced upon crushing of the ice cube can be obviated, while the parts (such as the transverse bars, stationary guide member and others) can be protected against failure. Additionally, impulse load applied on the chain and the driving means therefor such as the driving motor can be lowered, making it possible to use an electric motor having a lower rated torque.

When the ice lift apparatus is to be installed within the ice storage box having the front door 22, as shown in FIG. 10, it is preferred from the standpoint of security to include means for controlling the driving means so that the endless conveyor members are inhibited from being driven while the front door 22 opens.

Exemplary embodiments of such control means are shown in FIGS. 13, 14, 15A and 15B, respectively. First referring to FIG. 13, there is shown a switch 24 mounted on the ice making machine R, which switch 24 constitutes a simple control means for controlling the driving means of the ice lift apparatus. More specifically, the switch 24 is so arranged as to be opened when a switch pin 24a is pressed upon closing of the front door 22 while it is opened upon opening of the front door 22. This switch can be incorporated in series in a driving switch circuit (not shown) for controlling the driving means. The switch pin 24a may be provided with known anti-moisture measures.

Figure 14:
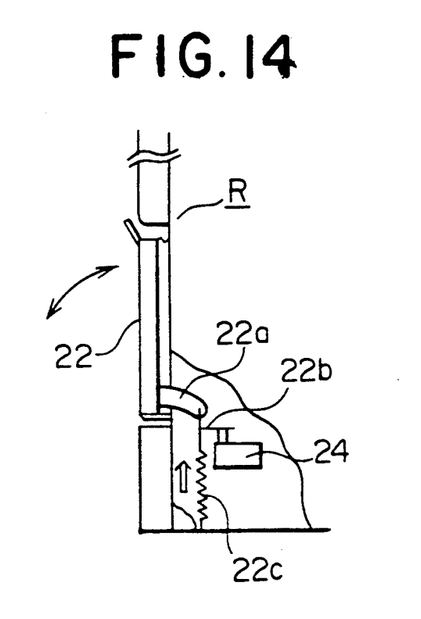

In the control means illustrated in FIG. 14, the front door 22 has a bracket 22a mounted thereon and a spring 22c is disposed under tension between the bracket 22a and the main body of the ice making machine R. With this arrangement, the switch 24 is closed when the front door 22 is closed while it is opened upon opening of the front door 22, as in the control switch arrangement shown in FIG. 13.

Figure 15A:
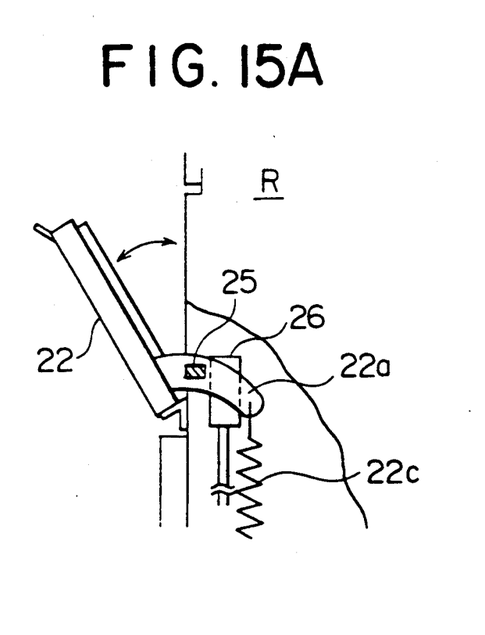
Figure 15B:
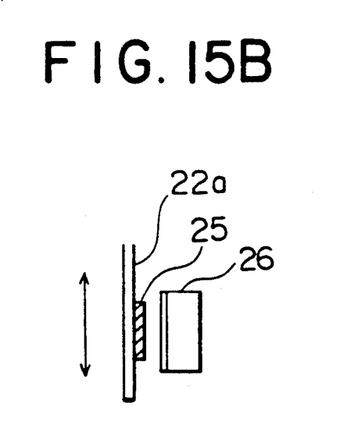

FIGS. 15A and 15B show another structure of the control means, in which the switch 24 shown in FIG. 14 is replaced by a reed switch 26 and a magnet 25 is mounted on a bracket 22a. In response to the opening or closing of the front door 22, contacts of the reed switch 26 are opened or closed, whereby corresponding signals are produced. These signals may be utilized for directly or indirectly controlling the driving means.

The control means for the driving means of the ice lift apparatus as described above by reference to FIGS. 13, 14, 15A and 15B cause the driving means to be inhibited from actuation even when the driving switch is pressed so long as the front door is opened. Thus, operator or user attempting to take out the ice cubes by opening the front door can be protected against the danger of his or her hands, fingers or the like being caught in moving parts such as the chains, transverse bars and others.

Figure 11:
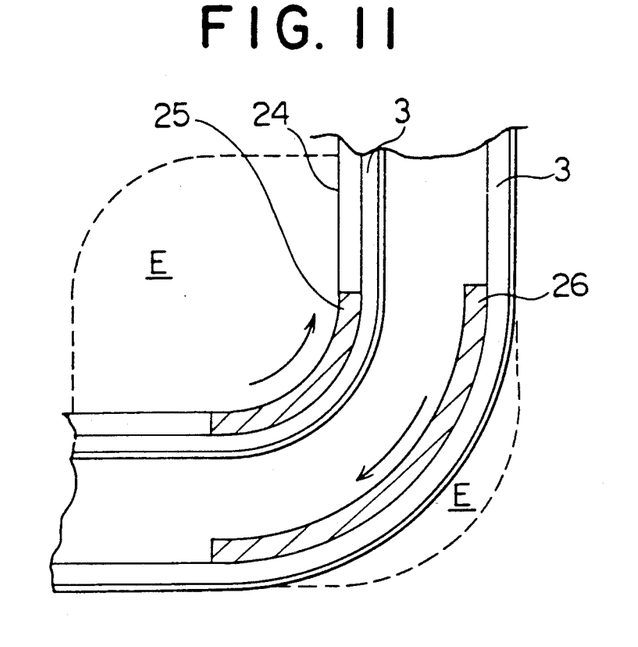
FIG. 11 is a sectional view showing a bent portion in an ice lift apparatus according to the invention which is so modified as to be adapted for use in a hitherto known ice making machine.

Referring to FIG. 11, the guide sprockets 7 and 9 may be replaced by stationary arcuate guide rails 25 and 26 each preferably made of a resin material having a durability, insusceptibility to water-absorption and a self-lubricating property. In this arrangement, the space for mounting these guide rails 25 and 26 can be significantly reduced as compared with that required for mounting the guide sprockets 7 and 9, as understood from a region E shown in FIG. 11 with being enclosed by a phantom line to represent the mounting space for the guide sprockets 7 and 9.

Figure 12:
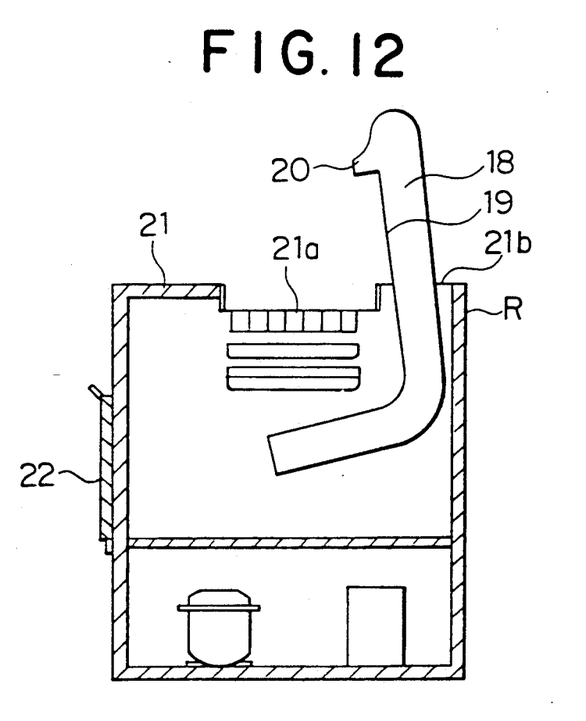
FIG. 12 is a sectional view illustrating the state in which the ice lift apparatus shown in FIG. 11 is installed in a hitherto known ice making machine.
Figure 13:
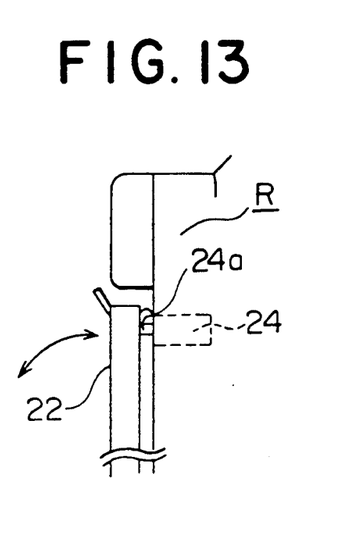
FIG. 13, FIG. 14 and FIGS. 15A and 15B are fragmental sectional views showing different exemplary embodiments of the control means for controlling the driving means for the ice lift apparatus, respectively.

Since the ice lift apparatus according to the present invention generally presents a substantially L-like configuration, it can be easily inserted and placed within the ice storage chamber of the conventional ice making machine in the assembled state through an opening 21b formed in the ceiling plate 21 adjacent to an ice mold mounting portion 21a, as shown in FIG. 12. Thereafter, the ice lift apparatus as inserted may be fixedly secured to the ceiling plate 21 by convenient fixing means (not shown). Although the arcuate guide rails 25 and 26 may undergo slightly higher abrasion due to friction with the chains 3, vibration and noise which are generated when the guide sprockets are employed can be obviated. In FIG. 11, a reference numeral 24 denotes a cover.

As will be understood from the above description, because the ice lift apparatus according to the present invention employs no buckets, rake means and rotatable cages which have been provided in the conventional ice lift apparatuses, the space occupied by the ice lift apparatus can be correspondingly decreased. This means that the ice lift apparatus according to the invention can be advantageously installed even within a narrow space. Also, not only the amount of ice cubes conveyed as well as the shape and size thereof can be maintained relatively constant, but also the position of the ice discharge section can be set up as required.

Further, when the vertical stationary guide member is so formed as to have a rough surface and/or dents and projections thereon with the ice guide being disposed in front of the transverse bars with a predetermined distance therefrom at the ice discharge section, the ice cubes being transported to the discharge section is positively prevented from adhering or sticking to the vertical stationary guide member, whereby they can be discharged without fail from the ice discharge section.

Additionally, when the ice lift apparatus according to the invention is applied to a conventional ice making machine equipped with an ice storage chamber having a front door, the provision of the control means for inhibiting actuation of the driving means under the opened state of the front door can protect the user or operator trying to taking out ice through the opened front door against injuries which might otherwise be brought about by the moving parts of the ice lift apparatus such as the chains, transverse bars, sprockets and others.

In the foregoing, although description has been made in conjunction with what is presently considered as preferred embodiments of the ice lift apparaus according to the present invention, it should be appreciated that the invention is not limited to these embodiments but is susceptible to numerous modifications thereof.

Figure 16:
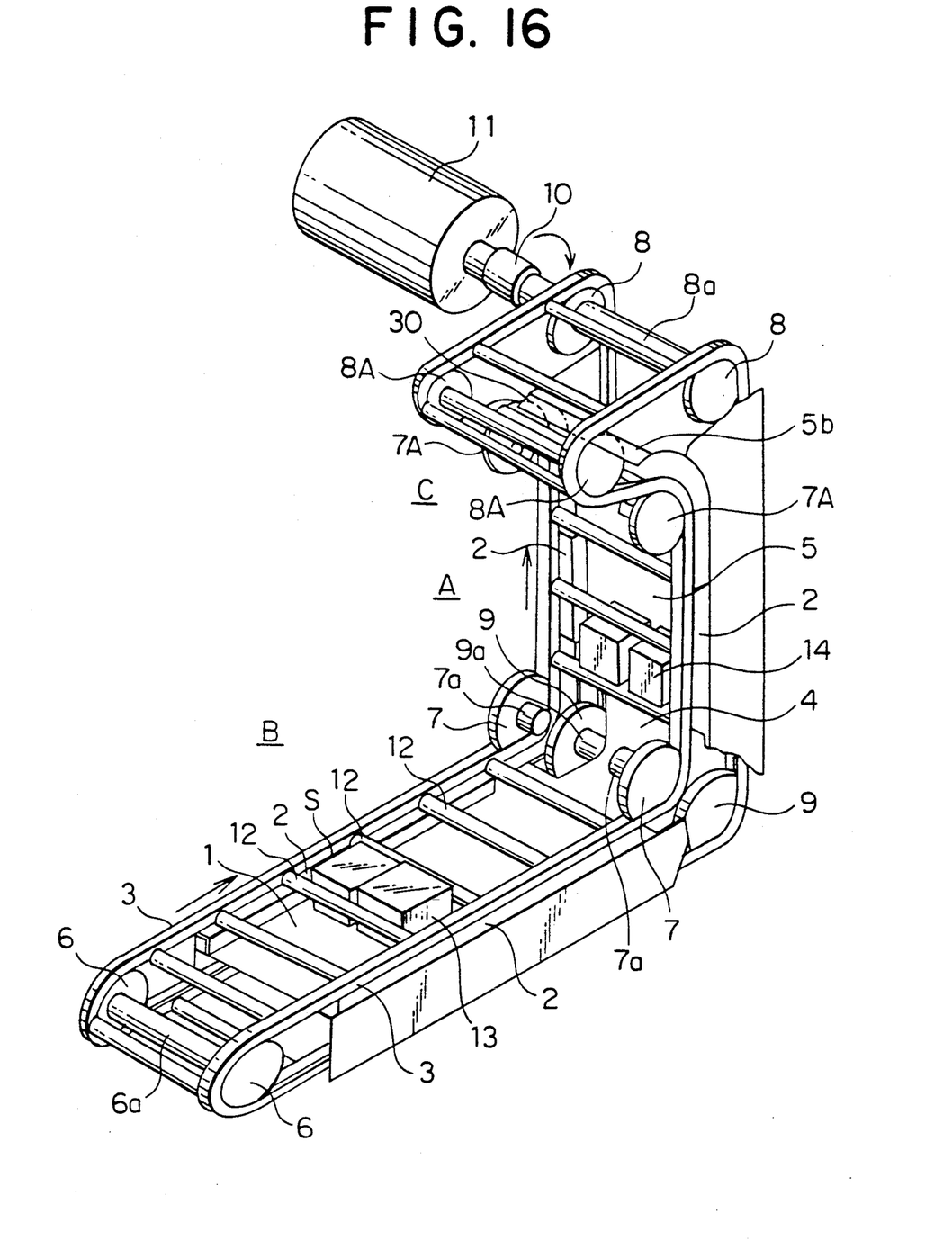
FIG. 16 is a perspective view schematically showing a further embodiment of the ice lift apparatus according to the present invention.

For example, as can be seen in FIG. 16, the ice lift apparatus comprises at least one pair of endless chains 3 driven by the motor 11 serving as the driving means, a large number of transverse bars 12 mounted between these chains 3 with an inter-bar distance which is slightly greater than the longest side of the ice cube to be carried, and the stationary guide member 5 which is disposed in a plane extending in parallel with a plane encompassing the transverse bars 12 with a distance from the latter which corresponds to about $\frac{1}{8}$ to 170 of the inter-bar distance. In such an ice lift apparatus, the ice discharge section C can be formed by disposing the stationary guide member 5 and the chains 3 with inclination in the substantially horizontal direction such that the stationary guide member 5 is disposed above some of the transverse bars 12 to thereby define a discharge space between the terminal end of the stationary guide member 5 and the guide 19 for the chains 3.

More specifically, in this modified embodiment, the ice discharge section C can be formed by selectively establishing such positional relationship among sprokets 7A and 8A, the stationary guide member 5 and the terminal end portions of the guide 19 as described below. Referring to FIG. 16, other sprockets 7A are rotatably disposed at positions above the respective sprockets 7, in a substantially vertical alignment, while additional sprockets 8A are rotatably mounted at a substantially same height as the sprockets 8 but higher as compared with the above-mentioned sprocket 7A with a greater distance from the sprockets 8 than those 7A, so that the chains 3 passing over the sprockets 7 can reach the sprockets 8 by way of the sprockets 7A, respectively. Further, referring to FIG. 17, the stationary guide member 5 and the guide 19 are so disposed as to terminate at positions above and below a portion of the chains 3 spanned between the sprockets 7A and 8A. In this manner, the running path of the chain 3 running toward the sprocket 8A by way of the sprocket 7A (not shown in FIG. 17) is disposed substantially horizontally, while each of the stationary guide member 5 and the guide 19 extends with a curvature so that the distances from the member 5 and the guide 19 to the running path of the chain 3 remain constant in the regions preceding and succeeding to the guide sprockets 7A with the tip ends of the member 5 and the guide 19 terminating at between the sprockets 7A and 8A. In this way, a space for discharging the ice cubes can be defined below the terminal end of the stationary guide member 5. It will be readily appreciated that the sprockets 7A shown in FIG. 16 may be replaced with an arcuate member 19c (see FIG. 17) similar to the guide rails 25 and 26.

Thus, in the ice discharge section C of the ice lift apparatus shown in FIGS. 16 and 17, the guide member 5 and the chains 3 are disposed in the substantially horizontal direction so that the former lies above some of the transverse bars 12 to thereby define the ice discharge space between the terminal end 5b of the guide member 5 and the guide 19 for the chains 3, the problem of the so-called ice jamming that the ice cubes 15 partly melted at the portion thereof supported by the transverse bar 12 may enter the space defined between the guide member 5 and the transverse bar 12 in the vicinity of the sprockets 8, as may occur in the embodiment of the invention shown in FIG. 1, or a problem that the small ice pieces collected and jammed between the guide member 5 and the transverse bar 12 are broken or crushed with violent noise can be solved satisfactorily.

Further, in the modified embodiment shown in FIGS. 16 and 17, an ice discharge aiding or facilitating plate 30 is provided at the tip end portion of the guide member 5, which plate 30 is disposed with inclination toward the lower running path of the chain 3 at a position downstream of the guide member 5 in the ice discharge section C, wherein the tip end of the ice discharge aiding or facilitating plate 30 constitutes the terminal end 5b of the stationary guide platform member 5, as can be best seen in FIG. 17. In this modified embodiment, the ice discharge aiding plate 30 has the inclined portion extending starting from a position distanced horizontally by H from the center axis 8Aa of the guide sprockets 8A, extending horizontally to the left for a distance l from that position and terminates with a distance h therefrom in the vertically downward direction. Since the position at which the ice discharge aiding plate 30 starts inclination, i.e. the horizontal distance H, relates to a position at which the ice cube is to be discharged (e.g. the position of a container such as a cup although not shown), the limit of the horizontal distance l is so selected as not to reach the transverse bar 12 which reverses its moving direction around the guide sprocket 8A, while the vertical limit of the distance h is so selected as not to bear on the top of the transverse bar 12 running substantially horizontally toward the guide sprocket 8A.

In the above-described modified embodiment, although the ice discharge aiding plate 30 is formed integrally with the guide member 5 by a plate-like member, it may be formed by a plate separately from the guide member 5. Alternatively, it may be constitued by a plurality of bar-like members instead of a single integral plate.

Further, the front cover or guide 19 shown schematically in FIG. 17 is disposed between the endless conveyor members 3 and curved or bent similarly to the guide member 5 in the vicinity of the guide sprockets 7A to terminate at a terminal end 19a. With this arrangement, it is possible to control the ice discharge position by varying the position of the terminal end 19a.

Figure 20:
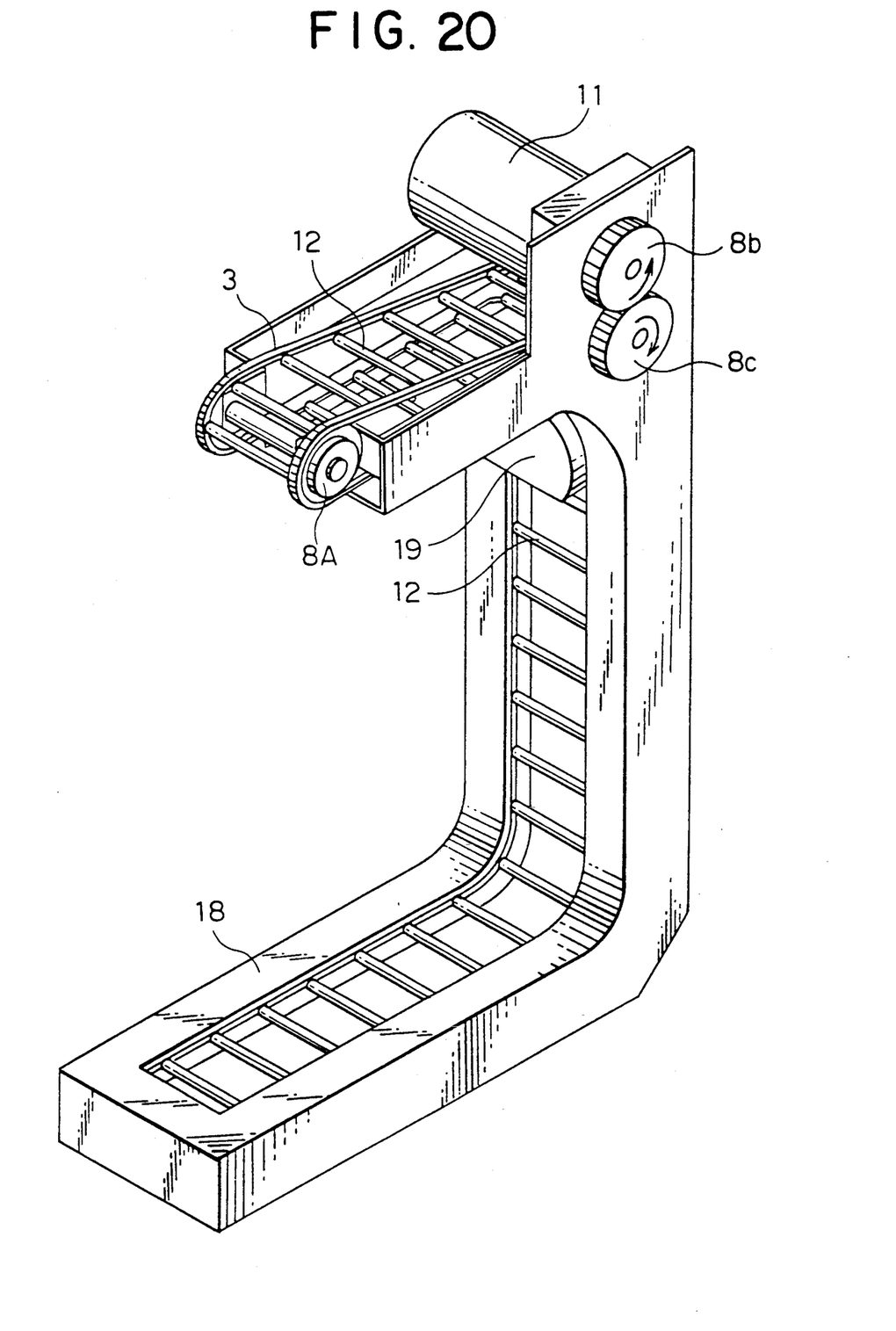
FIG. 20 is a perspective view showing a further modification of the ice lift apparatus shown in FIG. 16.

FIG. 20 shows a further embodiment according to the present invention, wherein a motor 11 is disposed above the sprockets 8 (not shown in FIG. 20) in order to provide a more compact ice lift apparatus. The motor 11 is adapted to rotate the sprockets 8 through rotatably supported gears 8b and 8c meshing with each other.

In operation of the ice lift apparatuses shown in FIGS. 16 to 18 and 20, assuming that a normal ice cube 15 has reached the ice discharge section C after having been pushed upwardly through cooperation of the stationary guide member 5 and the transverse bar 12 mounted on the chains 3 in the vertical transport section A, the ice cube 15 is free of the support of the stationary guide member 5 because of the horizontally inclined disposition of the stationary guide platform 5 and the transverse bars 12 in the ice discharge section C wherein the former overlies the latter. As a result, the ice cube 15 drops under gravity through the space defined between the transverse bars 12 in the case of absence of the front cover 19. However, as the front cover 19 is provided at a position for supporting the dropping ice cube 15, the ice cube 15 is supported by the front cover 19, then carried in the horizontal direction by being pushed by the associated transverse bar 12, and finally discharged from the tip of the terminal end portion 19a.

On the other hand, the ice cube 15 is not always a normal ice cube fed toward the discharge section C while being sandwiched between the adjacent transverse bars 12, but may be an ice cube of an abnormal shape carried toward the discharge section C while resting on a transverse bar 12 with the ice cube being partly melted. In the latter case, the ice cube is in the instable state and slidingly drops off from the transverse bar 12 when it moves beyond the terminal end of the stationary guide member 5, even when the drop aiding plate 30 is not provided. However, in the case of an ice cube 15′ presenting such an abnormal shape that not only the surface thereof which is in contact with the transverse bar 12 is melted but also fixedly engages with the latter, the ice cube 15′ remains in the state stably supported on the transverse bar 12 and tends to move toward the guide sprockets 8A without being discharged at the ice discharge section C. Accordingly, the probability of occurrence of the ice jamming at the guide sprockets 8A will be increased unless the ice discharge facilitaing plate 30 is provided.

However, in the modified FIGS. 16 and 17 embodiment, the downward inclined ice discharge aiding plate 30 is disposed at the tip end portion of the guide member 5 to ensure that the ice cube 15′ even of an abnormal shape can be discharged, as indicated by an arrow T, because of collision with the ice discharge aiding plate 30 before reaching the guide sprockets 8A. It is stated that the plate 30 may be substantially vertically disposed, although a force necessary to cause the ice cube to be separated from the guide member 5 slightly increases.

In any one of the above embodiments, the terminal end portion (i.e. the downstream end portion with respect to the ice transporting direction) of the front cover or guide 19 extends in the direction perpendicular to the ice transporting direction, although not shown. Consequently, two or more ice cubes, simultaneously conveyed with being sandwiched between the pair of transverse bars, are discharged simultaneously when they are moved beyond the tip end of the guide terminal end portion. If the discharge port 20 (FIG. 10) or a delivery guide (not shown) disposed below that port 20 is formed tapered, there arises the possibility that the simulataneously discharged ice cubes tend to be jammed in the discharge port 20.

It is desirable to prevent such a possibility from occurring. As the ice discharge position is usually determined by the tip end position of the guide 19, a notch 19b may be formed in the tip end portion 19a of the guide 19, as shown in FIG. 18. This results in that a plurality of ice cubes 15 being conveyed in the direction indicated by the arrow are prevented from simultaneously passing across the tip end. When the number of the ice cubes conveyed with being sandwiched between each pair of transverse bars is two, it is preferred that the length d of the notch 19b (i.e. the length in the ice transporting direction) is on the order the greatest length of the ice cube. Further, the dimension X shown in the figure should preferably be substantially equal to the longest side of the ice cube with the dimension Y being greater than the width X.

By forming the notch 19b in the tip end portion 19a of the guide 19, discharge of the ice cube passing over the guide portion not formed with the notcth is delayed, thus creating difference in the timing at which different ice cubes are discharged, whereby jamming at the discharge port or delivery guide can be positively prevented.

It is, therefore, to be understood that within the scope of the appended claims, the present invention may be practiced otherwise than as specifically described herein.

We claim:
1. An ice lift apparatus for vertically upwardly transporting ice cubes manufactured by an ice making machine, comprising:
   a horizontal ice transporting section extending substantially horizontally;
   a vertical ice transporting section connected continuously to said horizontal ice transporting section and extending substantially vertically;
   an ice discharge section provided adjacent to the top end portion of said vertical ice transporting section;
   at least two endless conveyor members spaced from each other by a distance which can receive at most two ice cubes in side by side relationship;
   means for rotatably supporting said endless conveyor members;
   means operatively connected to said supporting means for rotationally driving said endless conveyor members through said supporting means;
   a plurality of transverse bars mounted between said two endless conveyor members with an inter-bar span between said bars which is slightly greater than the longest side of an ice cube manufactured by said ice making machine; said plurality of transverse bars being arranged along substantially the entire length of a path formed by said conveyor members; and
   a stationary guide member disposed within a region enclosed by a running path along which said transverse bars are caused to move upon driving of said endless conveyor members, said stationary guide member being positioned with a distance relative to said running path which extends through said horizontal and vertical ice transporting sections, said distance being in a range of about ¼ to ⅜ of said inter-bar span.

2. An ice lift apparatus according to claim 1, wherein said ice making machine comprises an ice making mold for manufacturing ice cubes, and an ice storage chamber for receiving the ice cubes manufactured by said ice making mold, said ice storage chamber being provided with a ceiling plate and a front door openable and closable, said ice lift apparatus being disposed within said ice storage chamber.

3. An ice lift apparatus according to claim 2, wherein said horizontal ice transporting section is disposed within said ice storage chamber substantially at such a position that the ice cubes drop onto said horizontal ice transporting section from said ice making mold, and that said vertical ice transporting section is located in the inner part of the ice storage chamber with said ice discharge section being disposed above said ceiling plate.

4. An ice lift apparatus according to claim 1, wherein said horizontal and vertical ice transporting sections are disposed in a generally L-shaped arrangement, said stationary guide member being disposed in a generally L-shaped configuration along said horizontal and vertical ice transporting sections.

5. An ice lift apparatus according to claim 1, wherein said two endless conveyor members are each constituted by a rustproof chain.

6. An ice lift apparatus according to claim 5, wherein said chains are made of a stainless steel.

7. An ice lift apparatus according to claim 1, wherein said two endless conveyor members are each constituted by a rustproof timing belt.

8. An ice lift apparatus according to claim 7, wherein said timing belts are formed of a synthetic resin.

9. An ice lift apparatus according to claim 1, wherein said endless conveyor members are supported in said horizontal ice transporting section by guide rails disposed below said respective endless conveyor members and made of a self-lubricating material insusceptible to water absorption.

10. An ice lift apparatus according to claim 5, wherein said supporting means includes a pair of driving sprockets which are disposed at one end of said vertical ice transporting section remote from said horizontal ice transporting section and mesh with said associated chains, respectively, said pair of sprockets being formed of a rustproof material and coupled to each other by a shaft which is connected to said driving means constituted by a motor through a coupling.

11. An ice lift apparatus according to claim 10, wherein said driving sprocket shaft is adjustable in position together with said coupling and said motor to adjust tension in said chains.

12. An ice lift apparatus according to claim 1, wherein said vertical ice transporting section includes a guide plate disposed out of said region and extending substantially along said stationary guide member, said stationary guide member including a vertical portion extending along said vertical ice transporting section and having an upper part thereof disposed with such an inclination toward said guide plate that the distance from said transverse bars moving along said vertical portion is progressively narrowed, and wherein a top end of said guide plate and an end of said upper part of said vertical portion define the ice discharge port of said ice discharge section.

13. An ice lift apparatus according to claim 12, wherein the upper part of said vertical portion is provided on a surface thereof which comes into contact with said ice cube with means for preventing adhesion of the ice cube to said surface.

14. An ice lift apparatus according to claim 13, wherein said ice adhesion preventing means comprises a plurality of rib-like protrusions projecting from the surface of the upper part of said vertical portion toward said guide plate.

15. An ice lift apparatus according to claim 14, wherein each of said rib-like protrusions has a rough surface.

16. An ice lift apparatus according to claim 13, wherein said ice adhesion preventing means comprises a rough surface.

17. An ice lift apparatus according to claim 13, wherein said ice adhesion preventing means comprises a plurality of concaves.

18. An ice lift apparatus according to claim 13, wherein said ice adhesion preventing means comprises a net of a predetermined mesh.

19. An ice lift apparatus according to claim 1, said vertical ice transporting section including a guide plate disposed out of said region and extending substantially along said stationary guide member, wherein a lower part of a vertical portion of said stationary guide member extending along said vertical ice transporting section has an inclined surface disposed with a gentle inclination toward said guide plate so that distance relative to said transverse bars running along said vertical portion is progressively decreased, and an upper part of said vertical portion has a curved surface, and wherein the upper end of said guide plate and the upper part of said vertical portion cooperate to define the ice discharge port of said ice discharge section.

20. An ice lift apparatus according to claim 19, wherein said transverse bar is mounted rotatably with respect to said endless conveyor members.

21. An ice lift apparatus according to claim 2, further including means connected to said driving means for controlling said driving means so that operation of said driving means is inhibited in the open state of said front door.

22. An ice lift apparatus according to claim 21, wherein said control means includes switch means mounted on said ice making machine so that said control means controls operation of said driving means in responce to the opening and closing of said front door.

23. An ice lift apparatus, comprising:
at least two endless conveyor members spaced from each other by a distance which can receive at most two ice cubes in side by side relationship;
means for rotatably supporting said endless conveyor members;
means operatively connected to said supporting means for rotationally driving said endless conveyor members;
a multiplicity of transverse bars mounted between said two endless conveyor members at a substantially equidistance interval along substantially the entire length of a path formed by said conveyor members and
a stationary guide member disposed within a region enclosed by a path along which said transverse bars are caused to move when said endless conveyor members are driven;
wherein said stationary guide member has an upper end portion defining an ice discharge port and is so disposed that the distance to said path is progressively decreased toward said ice discharge port.

24. An ice lift apparatus according to claim 23, further comprising a substantially horizontal ice transporting section, a substantially vertical ice transporting section disposed in ice communication with said horizontal ice transporting section, and an ice discharge section located adjacent to an upper end of said vertical ice transporting section.

25. An ice lift apparatus according to claim 24, wherein said horizontal ice transporting section is provided separately from said vertical ice transporting section.

26. An ice lift apparatus according to claim 24, wherein said vertical ice transporting section is connected continuously to said horizontal ice transporting section.

27. An ice lift apparatus, comprising:
a substantially horizontally disposed ice transporting section;
a substantially vertical disposed ice transporting section disposed in communication with said horizontal ice transporting section;
an ice discharge section provided adjacent to the top end of said vertical ice transporting section;
at least two endless conveyor members spaced from each other by a distance which can receive at most two ice cubes in side by side relationship;
means for rotatably supporting said endless conveyor members;
means operatively connected to said supporting means for driving and rotating said endless conveyor members through said supporting means;
a multiplicity of transverse bars mounted between said two endless conveyor members along substantially the entire length of a path formed by said conveyor members at an interval slightly greater than a longest side of an ice cube to be transported;
a stationary guide member disposed in a plane within a region enclosed by a path along which said transverse bars are caused to move when driven by said endless conveyor members, said plane being parallel to a plane containing said path with a distance from said path extending through said horizontal and vertical ice transporting sections, said distance being in a range of about ½ to ⅔ of said interval; and
an ice guide plate disposed out of said region in opposition to said stationary guide member with said path being interposed between said guide plate and said guide member; and
wherein said ice discharge section is formed by inclining upper portions of said stationary guide member, said endless conveyor members and said ice guide plate in a substantially horizontal direction so that in said ice discharge section, said stationary guide member, said transverse bars and said ice guide plate assume upper, intermediate and lower positions, respectively, to thereby from an ice discharge space between tip ends of the upper portions of said stationary guide member and said ice guide plate.

28. An ice lift apparatus according to claim 27, wherein said said tip end of said stationary guide member is provided with an ice drop aiding member extending forwardly beyond the tip end of said ice guide plate.

29. An ice lift apparatus according to claim 27, wherein each of said endless conveyor members comprises an endless chain, and said supporting means comprises a set of supporting members so arranged as to allow each of said endless chains to run along a substantially L-like running path, each of said supporting members, located at the corner of said L-like running path, being in the form of a stationary arcuate guide rail made of a resin having durability and a self-lubricating property.

30. An ice lift apparatus according to claim 27, wherein each of said endless conveyor members comprises a endless chain, and said supporting means comprises a set of rotatable guide sprockets so arranged as to allow said endless chains to run along substantially L-like paths, respectively, said set of guide sprockets including first guide sprockets disposed at corners of said L-like paths, second guide sprockets disposed at a position substantially vertically above said first guide sprockets, and third guide sprockets disposed at a position higher than that of said second guide sprockets and with a distance therefrom in the direction downstream of said second guide sprockets with respect to the moving direction of said endless chains, whereby said endless chains can run over said first, second and third guide sprockets.

31. An ice lift apparatus according to claim 28, wherein said ice drop aiding member starts to incline at a position spaced by a horizontal distance (H) from the center axis of said third guide sprocket and terminates after extending therefrom for a horizontal distance (l) and a vertical distance (h) toward said third guide sprockets.

32. An ice lift apparatus according to claim 31, wherein said ice drop aiding member is formed integrally with said stationary guide member in a plate-like configuration.

33. An ice lift apparatus according to claim 31, wherein said ice drop aiding member comprises a plurality of parallel spaced bar-like portions.

34. An ice lift apparatus according to claim 27, wherein the tip end of said ice guide plate extends linearly in the direction substantially orthogonal to the running direction of said endless conveyor members moving along said path.

35. An ice lift apparatus according to claim 27, wherein a space defined between each pair of adjacent transverse bars has a volume capable of accommodating two ice cubes, and wherein said ice guide plate is provided with ice discharge delay means at the tip end thereof.

36. An ice lift apparatus according to claim 35, wherein said ice discharge delay means comprises a notch formed in said tip end.

* * * * *